(12) United States Patent
Salomon

(10) Patent No.: US 10,875,718 B2
(45) Date of Patent: Dec. 29, 2020

(54) METHOD AND DEVICE FOR ADJUSTING A PREFORM CONVEYOR

(71) Applicant: SIDEL PARTICIPATIONS, Octeville-sur-Mer (FR)

(72) Inventor: Gautier Salomon, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 16/645,374

(22) PCT Filed: Aug. 10, 2018

(86) PCT No.: PCT/EP2018/071785
§ 371 (c)(1),
(2) Date: Mar. 6, 2020

(87) PCT Pub. No.: WO2019/048182
PCT Pub. Date: Mar. 14, 2019

(65) Prior Publication Data
US 2020/0299066 A1 Sep. 24, 2020

(30) Foreign Application Priority Data
Sep. 6, 2017 (FR) .................................... 17 58205

(51) Int. Cl.
*B65G 21/20* (2006.01)
*B29C 49/42* (2006.01)
(Continued)

(52) U.S. Cl.
CPC ...... *B65G 21/2072* (2013.01); *B29C 49/4205* (2013.01); *B65G 43/00* (2013.01); *B65G 51/035* (2013.01); *B29C 2949/78773* (2013.01)

(58) Field of Classification Search
CPC ........ B65G 21/2045; B65G 2201/0244; B65G 21/20; B65G 21/2072; B65G 43/00;
(Continued)

(56) References Cited

U.S. PATENT DOCUMENTS 6,827,203 B2 * 12/2004 Andreoli ............ B65G 21/2072
198/836.3
8,851,806 B2 * 10/2014 Beutl .................. B29C 49/4268
406/86

(Continued)

FOREIGN PATENT DOCUMENTS

| EP | 1331182 A1 | 7/2003 |
| FR | 2806395 A1 | 9/2001 |

(Continued)

OTHER PUBLICATIONS

International Search Report dated Sep. 13, 2018.

*Primary Examiner* — James R Bidwell

(57) ABSTRACT

The invention includes a method for adjusting a preform conveyor. The method includes a preadjustment phase during which preforms of a first format are conveyed. Each preform is supported under its collar by guides delimiting a lateral space and the body of each preform is guided by rails delimiting a holding gap. The rim of each preform is guided by a top guide defining a maximum height, and the lateral support space, the lower holding gap, and the maximum height are independently adjusted with respect to the first format. The values of the first format are recorded. In order to convey preforms of a second format, the preadjustment phase is carried out, and in order to convey pre-forms of the first format, the lateral space, the holding gap and/or the maximum height are adjusted automatically according to the recorded values of the first format. The invention also relates to a suitable adjustment device.

9 Claims, 1 Drawing Sheet

(51) Int. Cl.
*B65G 43/00* (2006.01)
*B65G 51/03* (2006.01)

(58) Field of Classification Search
CPC ...... B65G 51/035; B65G 47/22; B65G 51/03;
B29C 49/4205; B29C 49/42; B29C 49/06
USPC ..................................................... 198/836.3
See application file for complete search history.

(56) References Cited

U.S. PATENT DOCUMENTS

| | | | |
|---|---|---|---|
| 2003/0164280 A1* | 9/2003 | Delaporte | B65G 51/035 198/836.3 |
| 2009/0290942 A1* | 11/2009 | Delaporte | B65G 51/035 406/88 |
| 2012/0090964 A1* | 4/2012 | Andreoli | B65G 21/2072 198/836.3 |
| 2012/0168284 A1* | 7/2012 | Pawelski | F15B 15/1404 198/836.3 |

FOREIGN PATENT DOCUMENTS

| | | |
|---|---|---|
| FR | 2885736 A1 | 9/2006 |
| WO | WO9936337 A1 | 7/1999 |

* cited by examiner

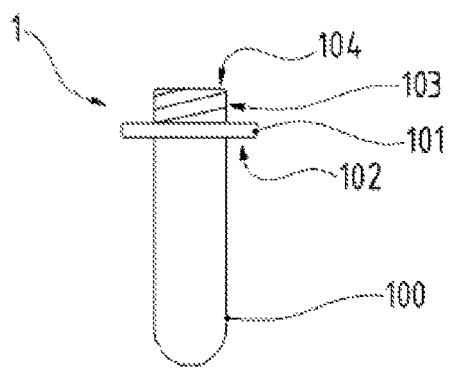
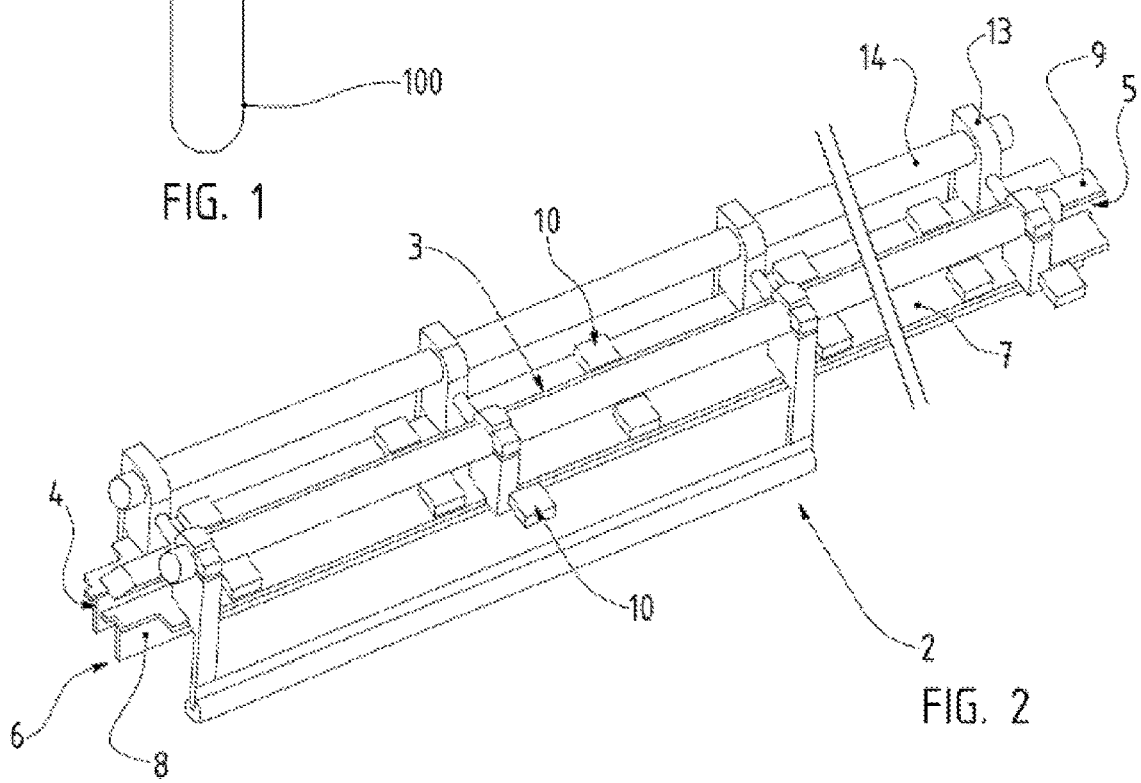
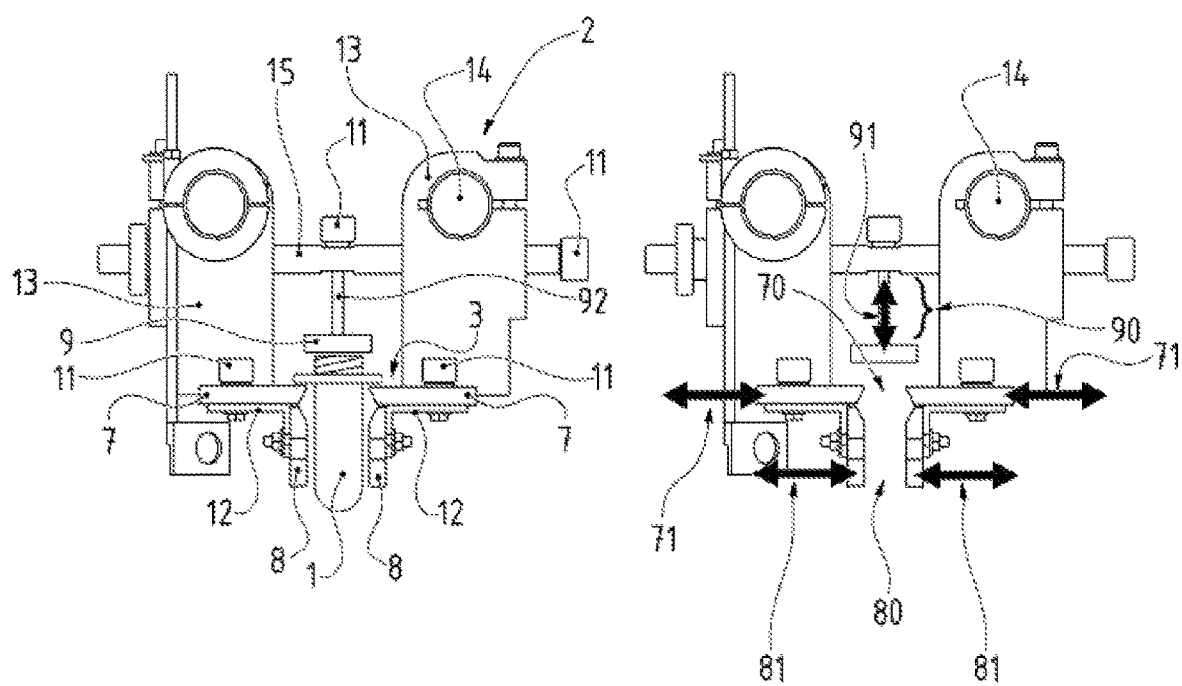

METHOD AND DEVICE FOR ADJUSTING A PREFORM CONVEYOR

The present invention lies in the field of conveying products of preform type on a production line, in particular a production line for blow molding containers.

The present invention concerns a method of adjusting a conveyor for preforms and a device for adjusting a conveyor for preforms.

In known manner, the manufacture of plastic material containers such as bottles and small bottles may be carried out during an operation of shaping by injection-blow molding from parisons commonly termed "preforms". These preforms have an oblong tubular shape comprising an open upper end. Each preform has the overall appearance of a test tube surmounted by a neck of the future container that it will constitute after blow molding.

To be precise, each preform consists of a body mounted by an annular collar projecting radially relative to said body, forming an under-collar portion. Said collar is provided on the top with a neck ending in a rim.

On a blow molding production line the preforms are transported by conveyors from an upstream module where said preforms may be manufactured, tipped out or stored, in order to feed another, downstream module, for example a blow molding module. Over and above continuous feeding at a high throughput, said conveyors may also ensure correct positioning of the preforms for the processing thereof by said downstream module on leaving them. To this end, the conveyors extend longitudinally between the upstream and downstream modules, from an inlet to an outlet, and include a plurality of means for holding and guiding the preforms throughout their conveyance. Such guide means are configured so as to orient the preforms vertically or substantially vertically, with their rim at the top, retained from below, under their collar, their base naturally being positioned at the bottom by gravity.

To be more precise, each preform is supported under its collar by at least one pair of guides defining a lateral support space for said under-collar portion; the lower part of each preform is guided by at least one pair of rails defining a lower transverse holding gap; its rim is guided by at least one top guide defining a maximum height between said guides and the rim. This three-way guidance ensures that each preform is held in this vertical position.

Such spacing being dependent on the dimensions specific to the preforms, it is then necessary to be able to adapt them on each production run as a function of the format of the preforms to be fed. To this end, the guide means, namely each pair of guides, each pair of rails and each top guide, comprise means for adjusting their respective spacings. To be more precise, said adjustment means consist of independent members for modifying the positions of the various units constituting the guide means to enable, on the one hand, the guides and/or the rails to be moved closer together or farther apart and, on the other hand, the height of said top guide is increased or reduced.

Moreover, it will be noted that the adjustment must be carried out extremely precisely and centered relative to the conveyor path, because of the means provided at the exit to receive the preforms, such as for example a notched wheel the housings of which, formed by the teeth, receive internally each preform.

Moreover, as a function of the length of the conveyor, said adjustment means respectively specific to the pair of rails, to the pair of guides and to the top guide may be distributed at different locations along said length. Actually, essentially by virtue of the mass of the guide means generating deformation, in particular bending, over the length of the conveyor, reaching several meters, it is necessary to distribute at different points over said total length a plurality of adjustment members for precisely adjusting said spacings of each unit. For example, for conveying means approximately four meters long adjustment members may be positioned every meter.

At present said adjustment means are manually operated, an operator actuating each adjustment member at each location along the length of the conveyor in order to reproduce exactly the required spacings for the correct holding and optimum circulation of preforms with a given format. This operation effected manually therefore remains very delicate and laborious. Moreover, a disadvantage lies in the risk of error at the time of the modification of an adjustment value from one member to another for the same unit, namely the guides, the rails or the top guide: the preforms are then no longer held and circulated appropriately at the level of the incorrectly adjusted adjustment member, which can lead to jams or incorrect positioning of the preforms, or even to stopping of the production line.

Moreover, at present the adjustments are effected in a first initial production phase, termed a "preadjustment" phase, which may last several hours, in order to obtain optimized holding and circulation of the preforms over all the length of the conveyor. These adjustments must be refined during this preliminary phase in order to obtain this result. Actually, the preforms with known theoretical dimensions may suffer very small fluctuations, in particular because of the plastic material constituting them. Such fluctuations, even if of the order of one tenth of a millimeter, must be taken under consideration essentially by virtue of the extremely high production rate, with several thousand preforms passing per hour. It is therefore necessary to refine each adjustment of each adjustment member, a long and laborious operation when it is effected manually.

Thereafter, during production, it is often necessary to intervene to modify the adjustment of one of the adjustment members, an operation once again effected manually. For safety reasons, the production rate of the line is then reduced, possibly even to zero, in order to effect this modification of the adjustment, leading to a loss of efficiency.

Also, at the time of a change of production, namely when the preforms to be conveyed have different formats, it is necessary to modify all the adjustments, once again manually, leading to a considerable loss of time, above all on returning to a production already carried out beforehand, the initial preadjustments of which have generally been badly preserved for each adjustment member of the adjustment means of each unit.

In this context, a first inventive approach has consisted in recording for each preform format data relating to the various adjustments of the guide means. This recording is effected during the preadjustment phase. It may also be refined by modification of the recorded data if an adjustment intervention takes place during production. Recorded in this way, the data for a first preform format may be recalled for easy and rapid adjustment of the guide means at the time of the production of said first preform format.

To this end, another aspect of the invention has consisted in automating the interventions for adjustment of the guide means at the level of the various adjustment members in order to dispense with manual intervention by an operator at each location of the conveyor. This automation is achieved by appropriate motorization of each adjustment member.

Moreover, automation needs to be independent for each group of adjustment members provided along the conveyor for separate adjustment of one type of unit, namely the guides, the rails or the top guide. However, the same type of unit must be adjusted in concert and to this end the invention controls the motorization of each group of adjustment members for conjoint modification of their positions. Thus a single command automatically and simultaneously controls the adjustment at the levels of the groups of different adjustment members.

Finally, by using remote control, the invention enables an operator to intervene directly on the adjustment of each adjustment member, one at a time or in groups.

To this end, the invention consists in a method of conveying preforms, each preform having a format and consisting at least of a body surmounted by an annular collar projecting radially relative to said body, forming an under-collar portion, and including on the top a neck terminated by a rim. Said method comprises a preadjustment phase during which preforms with a first format are conveyed along a longitudinal conveying surface and in which:

- each preform is supported under its collar by at least one pair of guides defining a lateral support space of said under-collar portion;
- the lower part of the body of each preform is guided by at least one pair of rails defining a lower transverse holding gap;
- the rim of each preform is guided by at least one top guide defining a maximum height between said guides and the rim;
- said pair of guides, said pair of rails, said top guide extending along the conveying length;
- said lateral support space, said lower holding gap and said maximum height being adjusted independently relative to said first format at different adjustment points distributed along the conveying length;
- the values of the upper lateral space, of the holding gap and of the maximum height for said first format of preforms are recorded.

Said method is characterized in that it comprises a starting phase in which the upper lateral space and/or the holding gap and/or the maximum height is or are adjusted automatically in accordance with said recorded values, whereby the conveyor may be used to convey another format of preforms between the preadjustment phase and the starting phase.

In other words, to convey preforms with a second format said preadjustment phase is carried out during which preforms with said second format are conveyed along said longitudinal conveying surface; to convey preforms with said first format, the upper lateral space, the holding gap and/or the maximum height is or are adjusted automatically in accordance with said recorded values.

In accordance with other, additional features, the upper lateral space, the holding gap and/or the maximum height may be adjusted at the level of said different adjustment points distributed along the conveying length or the longitudinal conveying surface in a manner tied to the upper lateral space, the holding gap and/or the maximum height, respectively.

The upper lateral space, the holding gap and/or the maximum height may be adjusted by remote control of said adjustment points.

The value of the upper lateral space, of the holding gap and/or of the maximum height may be modified at one adjustment point at least.

The invention also concerns a device of adjusting a conveyor of preforms, each preform having a format and consisting of at least one body surmounted by an annular collar projecting radially relative to said body, forming an under-collar portion, and including on the top a neck terminated by a rim, said conveyor comprising a longitudinal surface for conveying said preforms provided with means for guiding said preforms, said guide means consisting of:

- at least one pair of guides the positions of which define a lateral support space for said under-collar portion;
- at least one pair of rails the positions of which define a lower transverse holding gap;
- at least one top guide the position of which defines a maximum height between said guides and the rim;
- said device comprising means for adjusting said guide means, said adjustment means comprising independent members for adjusting the positions of each pair of guides, of each pair of rails and of each top guide, said adjustment members being distributed at adjustment points along said longitudinal conveying surface.

This kind of adjustment device is characterized in that it comprises:

- means for recording data on the positions of each pair of guides, of each pair of rails and of each top guide for each format of preforms;
- each adjustment member comprising means for driving the movement of each pair of guides, of each pair of rails and of each top guide;
- said driving means specific to the pair of guides, to the pair of rails and to the top guide being controlled in respective distinct groups;
- said adjustment means comprising means for automatic control of each group of said driving means as a function of said data recorded for each format of preforms.

According to other, additional features of an adjustment device of the above kind, said control means may comprise remote data processing means at least incorporating said recording means.

Other features and advantages of the invention will emerge from the following detailed description of nonlimiting embodiments of the invention given with reference to the appended figures, in which:

FIG. 1 represents schematically a preform in side view;

FIG. 2 represents schematically a simplified three-quarter perspective view from above of a conveyor equipped with the adjustment device according to the invention, showing in part the group by group control of the adjustment members; and FIGS. 3 and 4 represent schematically simplified views in vertical section of FIG. 2, showing the guide means of said conveyor adjusted in two different positions in order to convey two different preform formats, only one of which formats is represented in FIG. 3.

The present invention concerns conveying preforms 1.

Referring to FIG. 1, each preform 1 consists of at least one body 100 surmounted by an annular collar 101 projecting radially relative to said body 100, producing an under-collar portion 102, and provided on the top with a neck 103 ending in a rim 104.

Each preform 1 has a format. That format is determined by the various dimensions of each preform 1, in particular the length and the diameter of its body 100, the radius of its collar 101 and the height of its neck 103 with its rim 104.

The preforms 1 are fed by means of a conveyor 2. A conveyor 2 of this kind comprises a longitudinal surface 3 for conveying said preforms 1. It moves said preforms 1 along the conveyor 2 from an inlet 4 situated at the upstream end to an outlet 5 situated at the downstream end, relative to the direction of movement of the preforms 1.

Said longitudinal conveying surface 3 is provided with guide means 6 for guiding said preforms 1. Those guide means ensure the correct positioning of each preform 1 as it is moved, in particular by holding it transversely and serving as a support on which it rests.

To this end said guide means 6 consist of at least one pair of guides 7 the positions of which define a lateral space 70 to support said portion 102 under the collar 101; at least one pair of rails 8, the positions of which define a lower transverse holding gap 80; at least one top guide 9, the position of which defines a maximum height 90 between said guides 7 and the rim 104.

Said pair of guides 7, said pair of rails 8 and said top guide 9 extend along the conveying length. A plurality of pairs of guides 7, a plurality of pairs of rails 8 and a plurality of top guides 9 may be abutted end to end with one another so as to lengthen continuously and without interruption the longitudinal conveying surface 3.

According to the embodiment that can be seen in FIGS. 3 and 4 the guides 7 of a pair extend horizontally in the same plane, having parallel internal lateral edges. Such edges may be beveled, diverging from the interior toward the exterior and from the upper surface toward the lower surface of each guide 7 (i.e. diverging from the interior and downward). The spacing between the close together edges of said guides 7 constitutes said lateral space 70. Said collar 101 then comes to rest on the upper face of each guide 7, on either side of said lateral space 70, as shown in FIG. 3. The lateral space 70 must therefore be smaller than the projecting radius of said collar 101 in order to support it from below at the level of at least a part of its portion 102. A clearance may be formed so that said edges of the guides 7 do not come into contact with the outside wall of said body 100 in order not to grip it and to immobilize it during the movement of each preform 1.

Also, the rails 8 of a pair are parallel and extend vertically. The inside faces of a pair of rails 8, situated opposite one another, determine a spacing corresponding to said gap 80, serving to maintain each preform 1 in a vertical or substantially vertical position during its movement. The gap 80 is equivalent to the outside diameter of the body 100 of each preform 1, being slightly greater than the latter, ignoring the clearance, in order not to grip it and immobilize it during its movement.

It is found that each preform 1 is then just supported by its collar 101 bearing on the guides 7, coming naturally to be positioned with a vertical orientation by gravity alone. The verticality of this orientation is ensured on either side by said rails 8, restricting inclined positioning of the preforms 1.

This vertically upright orientation and the holding of said preforms 1 are improved by means of said top guide 9. To this end, the top guide 9 extends horizontally in a plane that is preferably parallel to and located above the plane of said guides 7. The lower face of the top guide 9 forms a slideway restricting vertical movement of the preforms 1 by determining the maximum height 90 between said lower face of said top guide 9 and the upper faces of said guides 7. Ignoring the clearance, said maximum height 90 must correspond to the thickness of the collar 101 plus the height of the neck 103 and of the rim 104, namely from the portion 102 under the collar 101 to the upper edge of said rim 104.

There is therefore a clear need to adjust the relative positions of the pair of guides 7, of the pair of rails 8 and of the upper rail 9 as a function of the formats specific to the preforms 1 to be conveyed, namely their dimensions. Moreover, an adjustment of this kind must be extremely precise, on the one hand ensuring correct holding of the preforms 1 to feed them in an optimum position and on the other hand so as not to grip them, which would cause friction liable to immobilize them.

To this end, each pair of guides 7, each pair of rails 8 and each top guide 9 is mobile. In particular, said guides 7 are mounted for a first horizontal movement in translation 71 while said rails 8 are mounted for movement in translation in a second horizontal direction 81. The top guide 9 is mounted for movement in vertical translation 91. It will be noted that the movements of the guides 7 in the first movement in translation 71 are tied to one another and are effected symmetrically on either side relative to the vertical longitudinal median plane of the conveyor 2. The movements of the rails 8 in the second movement in translation 81 are also tied, symmetrically on each side of the same median plane. The first horizontal movement in translation 71, the second horizontal movement in translation 81 and the vertical movement in translation 91 are represented by arrows in FIG. 4.

In accordance with the embodiment represented in FIGS. 3 and 4, to ensure the mobility of the elements constituting the guide means 6, the guides 7 and the rails 8 are mounted on two angle brackets 12 in the form of L-section profiles supported by pairs of blocks 13 spaced along said conveyor 2. Said blocks 13 are in particular aligned by means of longitudinal shafts 14 extending the whole length of the conveyor 2. Said blocks 13 are mobile in horizontal translation, enabling them to be moved closer together or farther apart, transversely relative to the length of said conveyor 2.

Said rails 8 are fixed and secured to the vertical face of each angle bracket 12, while said guides 7 are mounted to move in translation relative to the horizontal face of each angle bracket 12. The movements of the rails 8 are therefore caused by the movements of the blocks 13 while the movements of the guides 7 are independent.

Moreover, said top guide 9 is fixed to the lower end of at least one rod 92 centered relative to said median plane of said conveyor 2, each rod 92 being mobile vertically relative to a transverse shaft 15. A plurality of rods 92 sliding vertically on corresponding transverse shafts 15 positioned at different locations along the conveyor 2 therefore support said upper rail 9 from below. Also, the blocks 13 slide laterally relative to each transverse shaft 15.

To effect the movements and the adjustment of the positions of the aforementioned elements, said conveyor 2 comprises means 10 for adjustment of said guide means 6. Said adjustment means comprise adjustment members 11 independent of the positions of each pair of guides 7, of each pair of rails 8 and of each top guide 9. Also, said adjustment members 11 are distributed at adjustment points along said longitudinal conveying surface 3, as can be seen in the FIG. 2 example.

It is then possible to adjust the value of the lateral space 70 between the guides 7, the value of the gap 80 of the rails 8 and the value of the height 90, and to do so at the level of each adjustment point distributed along the conveyor 2 at which said adjustment members 11 are positioned. To summarize, the first movement in translation 71, the second movement in translation 81 and the movement in vertical translation 91 may be separately adjusted at each adjustment point.

In this regard, according to the invention, the conveying of the preforms 1 comprises a preadjustment phase during which preforms 1 with a first format are conveyed along the longitudinal conveying surface 3. As mentioned above, each preform 1 is supported under its collar 101 by at least one pair of guides 7 defining said lateral space 70 supporting said portion 102 under the collar 101. The lower part of the body 100 of each preform 1 is guided by at least one pair of rails 8 defining said lower transverse holding gap 80. The rim 104 of each preform 1 is guided by at least the top guide 9, defining said maximum height 90 between said guides 7 and said rim 104.

In order to adapt to the dimensions specific to the first format of the preforms 1 to be fed, said lateral space 70, said lower holding gap 80 and said maximum height 90 are adjusted independently relative to said first format at different adjustment points distributed along the longitudinal conveying length 3.

On completion of this preadjustment the invention records the values of the upper lateral space 70, of the holding gap 80 and of the maximum height 90 for said first format of preforms 1.

To convey preforms with a second format, said preadjustment phase is advantageously carried out during which preforms 1 with said second format are conveyed along said longitudinal conveying surface 3. The steps of adjustment of the respective spacings of the various elements of the guide means 6 are then reproduced at each adjustment point until the values for said second format have been recorded. This preadjustment operation and the recording of the data resulting therefrom are repeated for each unknown format of preforms 1. To summarize, if a format and the data relating to the adjustment of the guide means 6 are not recorded, then the preadjustment is carried out.

It will be noted that other information may be associated, such as the unique identification of each format of preforms 1, namely said first format and said second format but also any other format.

To this end the invention provides appropriate recording means, for example in computer form, such as a database.

Once a format has been recorded, if it is wished to convey preforms having a previously recorded format, it suffices to recover the values of the adjustments already carried out for that format. Thus to convey preforms 1 with said first format the upper lateral space 70, the holding gap 80 and/or the maximum height 90 are adjusted in accordance with said values recorded for this first format.

The lateral space 70, the holding gap 80 and/or the maximum height 90 may preferably be adjusted in a tied manner at the level of said different adjustment points distributed along the conveying length 3. In other words, said lateral space 70 may be modified simultaneously by applying the same value or the different values recorded for all the adjustment members 11 positioned at each adjustment point. The same goes for modification of the gap 80. The same goes for modification of the height 90.

For example, concerning adjustment of the lateral space 70, for a first format of preforms 1 there has been recorded a first input value 4, slightly higher than two intermediate values at two adjustment points situated along the longitudinal conveying surface 3, while a final output value 5 is equal to said first value. Then, when conveying the preforms with said first format, the invention makes it possible to know said first value, said final value and said two intermediate values of the respective adjustment points concerned and to apply those values for adjustment of the lateral space 70. The same may apply for adjustment of the gap 80. The same may apply for adjustment of the height 90.

The invention advantageously envisages effecting each adjustment automatically.

To this end, the invention motorizes the guide means 6 in order to actuate the movements of the elements constituting them. Thus each adjustment member 11 comprises means for driving the movement of each pair of guides 7, of each pair of rails 8 and of each top guide 9.

Also, said drive means specific to the pair of guides 7, to the pair of rails 8 and to the top guide 9 are respectively controlled in distinct groups. In other words, the movements of a group comprising said guides 7, the movements of a group comprising said rails 8 and the movements of a group comprising each top guide 9 are separately controlled.

In order to adjust automatically each of said groups, the invention provides integrated control means.

Such control means may comprise remote computer means able at least to integrate said recording means. Said control means may be computerized and comprise a human-machine interface, in particular in the form of a fixed or mobile computer terminal.

It is then possible to adjust the lateral space 70, the gap 80 and/or the height 90 by remote control of the adjustment members 11 situated at the levels of said adjustment points.

Said control means are connected to said drive means so as to control automatically the movements of each group as a function of said recorded data for each format of preforms 1.

It will be noted that from the control means it is possible to adjust the adjustment of only one adjustment point for the space 70, the gap 80 and/or the height 90, by motorization of the corresponding adjustment member 11, in order to refine the spacing at a location of the conveyor 2.

The invention also concerns a device for adjusting a conveyor 2 for preforms 1.

As mentioned above, said device comprises means for adjusting said guide means 6, said adjustment means comprising independent members 11 for adjusting the positions of each pair of guides 7, of each pair of rails 8 and of each top guide 9. Said adjustment members 11 are distributed at adjustment points along said longitudinal conveying surface 3.

This kind of adjustment device advantageously comprises means for recording data on the positions of each pair of guides 7, of each pair of rails 8 and of each top guide 9 fox each format of preforms 1.

Also, each adjustment member 11 comprises means for driving the movement of each pair of guides 7, of each pair of rails 8 and of each top guide 9, controlled in distinct groups.

Said adjustment means of the device comprise means for automatic control of each group of said drive means as a function of said data recorded for each format of preforms 1.

Accordingly, by means of the method and the device for adjusting a conveyor 2 for preforms 1, if the format of the preforms 1 to be conveyed has already been recorded, automatic actuation of the drive means of the adjustment members 11 is commanded, driving the pair of guides 7 under the collar 101, and/or the pair of rails 8 at the level of the body 100 and/or the top guide 9, so that the lateral space 70, the lateral space 80 and/or the height 90 are positioned at the prerecorded value.

The invention therefore enables precise automatic adjustment for each format of preforms 1 that have to be conveyed by accurate recording and recall of data previously used in production for that type of format, manifestly offering a saving of time and an improvement of efficiency, limiting the risks of errors and of wrong adjustments.

The invention claimed is:

1. A method of adjusting a conveyor (2) of preforms (1), each preform (1) having a format and comprising at least a body (100) surmounted by an annular collar (101) projecting radially relative to said body (100), forming a portion (102) under the collar (101), and including on the top a neck (103) terminated by a rim (104), said method comprising a preadjustment phase during which preforms (1) with a first format are conveyed along a longitudinal conveying surface (3) and wherein:
   each preform (1) is supported under its collar (101) by at least one pair of guides (7) defining a lateral support space (70) of said portion (102) under the collar (101);
   the lower part of the body (100) of each preform (1) is guided by at least one pair of rails (8) defining a lower transverse holding gap (80);
   the rim (104) of each preform (1) is guided by at least one top guide (9) defining a maximum height (90) between said guides (7) and the rim (104);
   said pair of guides (7), said pair of rails (8), said top guide (9) extending along the conveying length (3);
   said lateral support space (70), said lower holding gap (80) and said maximum height (90) being adjusted independently relative to said first format at different adjustment points distributed along the conveying length (3);
   values of the upper lateral space (70), of the holding gap (80) and of the maximum height (90) for said first format of preforms (1) are recorded;
said method comprising starting phase in which the upper lateral space (70) and/or the holding gap (80) and/or the maximum height (90) is or are adjusted automatically in accordance with said recorded values, whereby the conveyor may be used to convey another format of preforms between the preadjustment phase and the starting phase.

2. The adjustment method as claimed in claim 1, wherein the upper lateral space (70), the holding gap (80) and/or the maximum height (90) is or are adjusted at the levels of said different adjustment points distributed along the longitudinal conveying surface (2) in a manner tied to the upper lateral space, to the holding gap and/or to the maximum height, respectively.

3. The adjustment method as claimed in claim 1, characterized in that the upper lateral space (70), the holding gap (80) and/or the maximum height (90) is or are adjusted by remote control of said adjustment points.

4. The adjustment method as claimed in claim 1, characterized in that the value of the upper lateral space (70), of the holding gap (80) and/or of the maximum height (90) is modified at one adjustment point at least.

5. A device of adjusting a conveyor (2) of preforms (1), each preform (1) having a format and comprising of at least one body (100) surmounted by an annular collar (101) projecting radially relative to said body (100), forming a portion (102) under the collar (101), and including on the top a neck (103) terminated by a rim (104), said conveyor (2) comprising a longitudinal surface (3) for conveying said preforms (1) provided with means (6) for guiding said preforms (1), said guide means (6) comprising:
   at least one pair of guides (7) the positions of which define a lateral support space (70) for said portion (102) under the collar (101);
   at least one pair of rails (8) the positions of which define a lower transverse holding gap (80);
   at least one top guide (9) the position of which defines a maximum height (90) between said guides (7) and the rim (104);
   said adjustment device comprising a means (10) for adjusting said guide means (6), said adjustment means (10) comprising independent members (11) for adjusting the positions of each pair of guides (7), of each pair of rails (8) and of each top guide (9), said adjustment members (11) being distributed at adjustment points along said longitudinal conveying surface (3),
   wherein said adjustment device comprises:
      means for recording data on the positions of each pair of guides (7), of each pair of rails (8) and of each top guide (9) for each format of preforms (1);
      each adjustment member (11) comprising means for driving the movement of each pair of guides (7), of each pair of rails (8) and of each top guide (9);
      said driving means specific to the pair of guides (7), to the pair of rails (8) and to the top guide (9) being controlled in respective distinct groups;
      said adjustment means (10) comprising means for automatic control of each group of said driving means as a function of said data recorded for each format of preforms (1).

6. The adjustment device as claimed in claim 5, wherein said control means comprise remote data processing means at least incorporating said recording means.

7. The adjustment method as claimed claim 2, characterized in that the upper lateral space (70), the holding gap (80) and/or the maximum height (90) is or are adjusted by remote control of said adjustment points.

8. The adjustment method as claimed in claim 2, characterized in that the value of the upper lateral space (70), of the holding gap (80) and/or of the maximum height (90) is modified at one adjustment point at least.

9. The adjustment method as claimed in claim 3, characterized in that the value of the upper lateral space (70), of the holding gap (80) and/or of the maximum height (90) is modified at one adjustment point at least.

* * * * *